(12) United States Patent
Jain (10) Patent No.: US 10,070,598 B2
(45) Date of Patent: Sep. 11, 2018

(54) INTELLIGENT AGRICULTURAL SYSTEMS

(71) Applicant: Intel Corporation, Santa Clara, CA (US)

(72) Inventor: Sandeep K. Jain, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 262 days.

(21) Appl. No.: 14/998,260

(22) Filed: Dec. 24, 2015

(65) Prior Publication Data

US 2017/0181389 A1    Jun. 29, 2017

(51) Int. Cl.
| | |
|---|---|
| *G06F 19/00* | (2018.01) |
| *A01G 25/16* | (2006.01) |
| *H04W 4/00* | (2018.01) |
| *G05B 15/02* | (2006.01) |
| *A01C 21/00* | (2006.01) |
| *A01G 27/00* | (2006.01) |
| *A01C 14/00* | (2006.01) |
| *A01M 21/00* | (2006.01) |
| *H04W 4/80* | (2018.01) |

(52) U.S. Cl.
CPC ............ *A01G 25/167* (2013.01); *A01C 14/00* (2013.01); *A01C 21/007* (2013.01); *A01G 27/008* (2013.01); *A01M 21/00* (2013.01); *G05B 15/02* (2013.01); *H04W 4/008* (2013.01); *H04W 4/80* (2018.02)

(58) Field of Classification Search
CPC .... A01G 26/167; A01G 27/008; G05B 15/02; A01C 14/00; A01C 21/007
See application file for complete search history.

(56) References Cited

U.S. PATENT DOCUMENTS

| | | | | |
|---|---|---|---|---|
| 6,091,997 | A * | 7/2000 | Flamme | A01B 79/005 |
| | | | | 111/903 |
| 8,572,290 | B1 * | 10/2013 | Mukhopadhyay | ......... |
| | | | | G06F 17/30094 |
| | | | | 709/251 |
| 8,649,907 | B2 * | 2/2014 | Ersavas | A01G 1/00 |
| | | | | 700/275 |
| 8,994,529 | B2 * | 3/2015 | White | A01M 1/2022 |
| | | | | 239/329 |

(Continued)

*Primary Examiner* — Michael D Masinick
(74) *Attorney, Agent, or Firm* — Grossman, Tucker, Perreault & Pfleger, PLLC (57) ABSTRACT

An agricultural data collection system may include a plurality of self-powered agricultural data collection devices disposed across an agricultural area. The agricultural data collection system may also include a plurality of self-powered agricultural output devices that control the distribution of one or more agricultural resources across at least a portion of the agricultural area. The plurality of self-powered agricultural data collection devices and the plurality of self-powered agricultural output devices may communicate wirelessly to selectively implement an agricultural management method that uses data collected by the self-powered agricultural data collection devices to provide agricultural resources where needed within localized agricultural areas within a larger agricultural area. At times, the agricultural management method may include an adaptive method that employs machine learning principles to optimize agricultural production within the agricultural area.

24 Claims, 3 Drawing Sheets

(56) References Cited

U.S. PATENT DOCUMENTS

| | | | | |
|---|---|---|---|---|
| 2003/0151513 | A1* | 8/2003 | Herrmann | G08B 25/003 340/573.1 |
| 2006/0271262 | A1* | 11/2006 | McLain, III | A01B 79/005 701/50 |
| 2009/0216345 | A1* | 8/2009 | Christfort | G05B 19/0428 700/21 |
| 2011/0270448 | A1* | 11/2011 | Kantor | A01G 25/165 700/284 |
| 2012/0143383 | A1* | 6/2012 | Cooperrider | H04Q 9/00 700/295 |
| 2014/0012732 | A1* | 1/2014 | Lindores | A01B 79/005 705/37 |
| 2014/0277959 | A1* | 9/2014 | Wagers | A01C 21/005 701/50 |
| 2017/0181389 | A1* | 6/2017 | Jain | A01G 25/167 |

* cited by examiner

INTELLIGENT AGRICULTURAL SYSTEMS

TECHNICAL FIELD

The present disclosure relates to agricultural sensors and methods of using agricultural sensors.

BACKGROUND

An increasing population places an increasing demand on the agricultural systems in all nations. As demand increases and natural resources either become scarce or costly, agricultural systems that are able to more accurately forecast agricultural resource requirements (e.g., water, fertilizer, herbicides, insecticides) play an increasingly important role in increasing per acre production while maintaining a relatively low per acre cost. In addition, soil and/or growth conditions may vary across an agricultural area as a consequence of topography or other factors. Thus, subjecting an entire agricultural area to a uniform resource application (e.g., uniform watering, fertilization, weed control, and/or insect control) may result in a wasteful over application of resources in some portions of the agricultural area and an insufficient under application of resources in other portions of the agricultural area.

Optimal crop growth is attained when soil parameters, such as moisture and fertilizer levels, are maintained within a range appropriate for the specific crop. Precision application of agricultural, resources such as water and fertilizer, thus plays an important role in maintaining an adequate flow of crops throughout the food chain. Many current systems are closed loop systems that do not provide remote connectivity, for example through the Internet of Things (IoT). In addition, current systems require the application of external power, limiting the usage of such systems in remote and/or underdeveloped areas where energy sources may be absent or unreliable. Additionally, many such systems rely on historical climatological data which may be inaccurate during periods of climate change.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

The systems and methods described herein may revolutionize crop production by providing a connected, intelligent agricultural system that tailors the application of agricultural resources, such as water, to the conditions found in localized agricultural areas, thereby providing water savings of up to 70%. Similar economies may be available in other agricultural resources such as fertilizer, insecticides, and herbicides. Tailoring fertilizer, insecticide, and herbicide application to suit local growing conditions is ecologically friendly and may provide additional benefits such as reduced runoff of such materials to bodies of surface water.

Beneficially, the systems and methods described herein are relatively low in cost and high in data transparency by virtue of the communications capabilities of the self-powered data collection and output devices described herein. The proposed technology takes advantage of data collection and output devices that are self-powered, for example using solar collection devices. Further, the self-powered data collection devices that are useful for real-time monitoring of environmental conditions, such as soil moisture levels. In addition each of the self-powered data collection devices may form a portion of a distributed control system that monitors and controls the distribution of one or more agricultural resources within a defined agricultural area. The self-powered data collection devices provide mechanical monitoring capabilities and may provide alerts or similar notices in the event of an agricultural resource system failure. The system provided by a plurality of self-powered data collection devices disposed across an agricultural area provides an efficient, cost effective, automated, non-battery operated agricultural resource management system through a combination of real time and historical data.

The system includes a number of self-powered agricultural data collection device and a number of self-powered agricultural output devices. In embodiments, the self-powered agricultural data collection devices may include systems that collect environmental data such as solar radiation, pressure, humidity, soil moisture, and temperature in specific locations within an agricultural area. The collected environmental data is converted to a digital signal that is communicated to an on-board control circuit, such as a Risher microcontroller unit.

In some instances, some or all of the self-powered agricultural data collection devices may wirelessly communicate some or all of the environmental data collected to at least one other nearby or neighboring self-powered agricultural data collection device. Thus, in some implementations, each self-powered agricultural data collection device may determine whether to request distribution of an agricultural resource by considering the environmental conditions across an agricultural area. Thus, for example, a particular self-powered agricultural data collection devices may delay requesting water distribution to alleviate a moderate dry soil condition if other self-powered agricultural data collection devices are requesting a water distribution to alleviate a severe dry soil condition elsewhere in the agricultural area.

At least some of the self-powered agricultural data collection devices in an agricultural area may communicate a request for a self-powered agricultural output device to distribute an agricultural resource, such as water, across at least a portion of the agricultural area in response to a detected and/or measured environmental condition. In some instances, the self-powered agricultural output device may receive wireless signals from a number of self-powered agricultural data collection devices and determine whether to distribute an agricultural resource across all or a portion of the agricultural area covered by the self-powered agricultural data collection devices.

An agricultural resource management system is provided. The system may include a plurality of self-powered data collection devices disposed across at least a portion of an agricultural area. Each of the self-powered agricultural data collection devices may include: an energy collector; an environmental sensor; a communication interface; a control circuit communicably coupled to the environmental sensor; a storage device communicably coupled to the control circuit, the storage device including machine-readable instructions, that when executed by the control circuit. The control circuit may collect environmental data within a localized agricultural area proximate the self-powered data collection device via the environmental sensor; exchange at least a portion of the collected environmental data with at least some of the remaining plurality of self-powered data collection devices; and cooperatively monitor and control distribution of an agricultural resource across at least a portion of the agricultural area that includes the respective localized agricultural area proximate the respective self-powered data collection device.

A self-powered agricultural data collection device. The self-powered agricultural data collection device may include an energy collector; an environmental sensor; a communication interface; a control circuit communicably coupled to the environmental sensor; and a storage device communicably coupled to the control circuit, the storage device including machine-readable instructions. The machine-readable instructions causing the control circuit to: collect environmental data within a localized agricultural area proximate the self-powered data collection device via the environmental sensor; exchange at least a portion of the collected environmental data with at least some of a plurality of self-powered data collection devices; and cooperatively monitor and control, with the at least some of the plurality of self-powered data collection devices, at least one output device that distributes an agricultural resource across at least a portion of the agricultural area that includes the respective localized agricultural area proximate the respective self-powered data collection device.

An agricultural data collection method is provided. The method may include collecting environmental data within a localized agricultural area proximate each respective one of a plurality of self-powered agricultural data collection devices via an environmental sensor communicably coupled to each respective one of the self-powered agricultural data collection devices. The method may further include exchanging at least a portion of the collected environmental data with at least some of the plurality of self-powered data collection devices and cooperatively determining, by at least a portion of the plurality of self-powered agricultural data collection devices, a control strategy for at least one self-powered agricultural output device that distributes an agricultural resource across at least a portion of the localized agricultural area proximate each respective one of the plurality of self-powered agricultural data collection devices.

As used herein, the terms "top" and "bottom" are intended to provide a relative and not an absolute reference to a location. Thus, inverting an object described as having a "top portion" and a "bottom portion" may place the "bottom portion" on the top of the object and the "top portion" on the bottom of the object. Such configurations should be considered as included within the scope of this disclosure.

As used herein, the terms "first," "second," and other similar ordinals are intended to distinguish a number of similar or identical objects and not to denote a particular or absolute order of the objects. Thus, a "first object" and a "second object" may appear in any order—including an order in which the second object appears before or prior in space or time to the first object. Such configurations should be considered as included within the scope of this disclosure.

Figure 1:
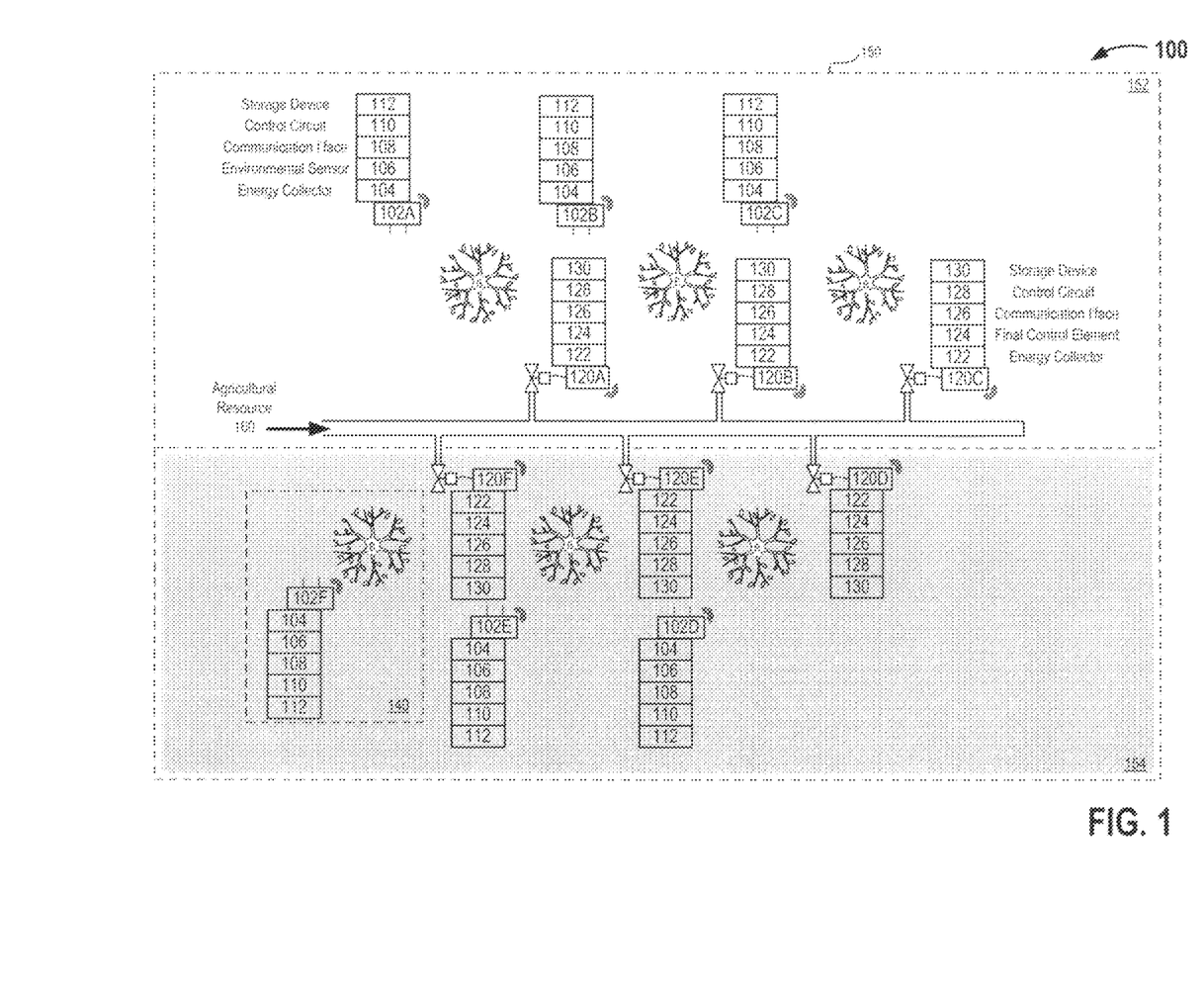
FIG. 1 is a schematic diagram of an example intelligent agricultural system, in accordance with at least one embodiment of the present disclosure.

FIG. 1 is a schematic diagram of an example intelligent agricultural system 100 that includes a number of self-powered agricultural data collection devices 102A-102$n$ (collectively, "self-powered agricultural data collection devices 102") and a number of self-powered agricultural output devices 120A-120$n$ (collectively, "self-powered agricultural output devices 120"), in accordance with at least one embodiment of the present disclosure. The system 100 includes a number of self-powered agricultural data collection devices 102 and a number of self-powered agricultural output devices 120 disposed across an agricultural area 150. Self-powered agricultural data collection devices 102A-102C are disposed in an agricultural area 152 having a first set of environmental conditions (e.g., sloped, low soil moisture, full sunlight) and self-powered agricultural data collection devices 102D-102F are disposed across in agricultural area 154 having a second set of environmental conditions (e.g., relatively flat, average soil moisture, partial shade).

Each of the self-powered agricultural data collection devices 102 may include one or more energy collectors 104, one or more environmental sensors 106, one or more wireless communications interfaces 108, one or more control circuits 110, and one or more storage devices 112. Each of the self-powered agricultural output devices 120 may include one or more energy collectors 122, one or more final control elements 124, one or more communication interfaces 126, one or more control circuits 128, and one or more storage devices 130.

Each self-powered agricultural data collection device 102 monitors one or more environmental parameters within a localized agricultural area 140. The self-powered agricultural data collection devices 102 and the localized agricultural areas 140 associated with each of the self-powered agricultural data collection devices 102 may be disposed randomly, semi-randomly, or in a defined pattern across all or a portion of the agricultural area 150. The environmental parameters may include, but are not limited to, one or more of the following: soil moisture, soil nitrogen levels, soil potassium levels, soil phosphorous levels, soil iron levels, atmospheric humidity, soil temperature, atmospheric temperature, solar intensity, or combinations thereof.

Each of the self-powered agricultural data collection devices 102 includes at least one energy collector 104. The at least one energy collector 104 may include any number and/or combination of current and/or future developed energy collection devices or systems capable of converting one or more environmental phenomenon to electrical energy. A non-limiting example of an energy collector 104 may include, but is not limited to, one or more solar energy collection devices such as one or more polymorphic silicon solar cells or one or more polymer solar cells.

Each of the self-powered agricultural data collection devices 102 includes at least one environmental sensor 106. Each environmental sensor 106 may detect one or more parameters of the environment about at least a portion of the respective self-powered agricultural data collection device 102 and generate a digital or analog output signal that includes data or information indicative of the sensed environmental parameter. The at least one environmental sensor 106 may include any number and/or combination of current and/or future developed sensors capable of sensing one or more environmental parameters and generating an output signal that includes data or information indicative of the sensed environmental parameter. Non-limiting examples of environmental sensors 106 may include, but are not limited to, capacitive moisture sensors, humidity sensors, temperature sensors, nitrogen sensors, potassium sensors, phosphorous sensors, iron sensors, ultraviolet (UV/UVA/UVB) sensors, or combinations thereof.

Each of the self-powered agricultural data collection devices 102 includes at least one communications interface 108. In embodiments, the at least one communications interface 108 may include any number and/or combination of any current and/or future wireless communication interface 108. The at least one communications interface 108 may communicate using one or more standard communication protocols, one or more proprietary communication protocols, or combinations thereof. Example wireless communication protocols may include, but are not limited to, BLUETOOTH® (IEEE 802.15.1, latest version), BLUETOOTH Low Energy (BLE) or BLUETOOTH Smart®, Near Field Communication (NFC-ISO/IEC 14443, latest version), or ZigBee Mesh (IEEE 802.15.4, latest version). The at least one communications interface 108 may include any number and/or combination of current and/or future developed communication interface capable of generating a wireless (e.g., radio frequency, optical) signal carrying data or information indicative of the one or more environmental parameters sensed by the at least one environmental sensor 106.

Each of the self-powered agricultural data collection devices 102 includes at least one control circuit 110. In embodiments, the at least one control circuit 110 may include one or more circuits or similar devices capable of executing machine-readable instruction sets. In some implementations, the at least one control circuit 110 may include any number and/or combination of any current and/or future developed devices and/or systems including configurable electronic devices and/or semiconductor components. In embodiments, the at least one control circuit 110 may include, but is not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), field programmable gate arrays (FPGAs), and the like. In some implementations, the at least one control circuit 110 may include one or more low power consumption devices. An example control circuit 110 may include, but is not limited to, a Risher Mote as manufactured by Intel Corp. (Santa Clara, Calif.).

In some implementations, the at least one control circuit 110 may be communicably coupled to some or all of: the at least one energy collector 104, the at least one environmental sensor 106, and/or the at least one communications interface 108. In some implementations, the at least one control circuit 110 may include one or more digital-to-analog converters, one or more analog-to-digital converters, one or more signal processors, one or more signal filters, or similar.

In at least some implementations, the control circuit 110 in each of the self-powered agricultural data collection devices 102 may autonomously execute machine-readable instruction sets that include self-learning or self-adapting components that permit the control circuit 110 to autonomously adapt to variable environmental conditions. In some implementations, the control circuit 110 in each of the self-powered agricultural data collection devices 102 may exchange bidirectional communication with at least some of a plurality of self-powered agricultural data collection devices 102 disposed in the agricultural area 150. In such implementations, the control circuits 110 in two or more self-powered agricultural data collection devices 102 may operate cooperatively and/or act in concert. In such implementations, the control circuits 110 in two or more self-powered agricultural data collection devices 102 may autonomously execute, in whole or in part, machine-readable instruction sets that include self-learning or self-adapting components that permit the control circuits 110 to autonomously adapt to variable environmental conditions.

Each of the self-powered agricultural data collection devices 102 includes at least one storage device 112. The at least one storage device 112 may include any number and/or combination of current and/or future developed data storage device capable of storing or otherwise retaining data that may include the one or more machine-readable instruction sets executed by the at least one control circuit 110. Non-limiting examples of such storage devices 112 include electromagnetic storage devices, semiconductor storage devices, magnetic storage devices, electroresistive storage devices, molecular storage devices, or combinations thereof.

In some implementations, some or all of the one or more energy collectors 104, one or more environmental sensors 106, one or more wireless communications interfaces 108, one or more control circuits 110, and one or more storage devices 112 may be disposed on a single substrate or similar material that forms at least a portion of the structure of each of the self-powered agricultural data collection devices 102. In at least some implementations, the self-powered agricultural data collection devices 102 may be advantageously fabricated using a weatherproof (e.g., waterproof) package. Furthermore, the self-powered agricultural data collection devices 102 may advantageously be manufactured in small sizes and relatively inexpensively to permit the distribution of collection devices in relatively dense concentrations across an agricultural area 150.

Each self-powered agricultural output device 120 can control, adjust or otherwise alter an operating parameter of one or more final control elements. Non-limiting examples of such final control elements include, but are not limited to, variable speed motor drives, solenoid valves, electronic actuators, dry chemical feeders, storage hoppers, augers, conveyors, or combinations thereof. In some implementations, the self-powered agricultural output devices 120 across an agricultural area 150 may be operated together, for example all of the irrigation valves positioned to feed water to specific agricultural area may be opened at the same time and/or for the same duration. In some implementations, the self-powered agricultural output devices 120 may be incorporate a final control element directly. In other implementations, the self-powered agricultural output devices 120 may provide an output that may be used to control the operation of a final control element. In some implementations, the self-powered agricultural data collection devices 102 may detect environmental conditions corresponding to an over-application of one or more environmental resources 160. For example, the self-powered agricultural data collection devices 102 may detect, as a high-moisture condition, the failure of a final control element 124 controlling the application of water to an environmental area 150.

Beneficially, the self-powered agricultural output devices 120 may be individually addressable and operated on different schedules based on the specific needs of localized agricultural areas 154. For example, the self-powered agricultural management system 100 may selectively apply an agricultural resource 160, such as water, only to a first portion 152 of the agricultural area 150 having a low-moisture environmental condition as sensed by the self-powered agricultural data collection devices 120 in the first portion 152 while withholding the agricultural resource from a second portion 154 of the agricultural area 150 having an adequate moisture environmental condition as sensed by the self-powered agricultural data collection devices 120 in the second portion 154.

In embodiments, some or all of the self-powered agricultural data collection devices 102 may bidirectionally communicate and may cooperatively monitor and control the operation of one or more self-powered agricultural output devices 120. In such embodiments, some or all of the self-powered agricultural data collection devices 102 may exchange wireless signals with one or more other self-powered agricultural data collection devices 102. Such signals may include data or information indicative of one or more environmental parameters at the respective self-powered agricultural data collection device 102 providing the signal.

In other embodiments, some or all of the self-powered agricultural data collection devices 102 may bidirectionally communicate with one or more self-powered agricultural output devices 120. In such embodiments, some or all of the self-powered agricultural output devices 120 may execute control logic to alter, adjust, and/or control one or more final control elements based at least in part on environmental parameters communicated to the self-powered agricultural output devices 120 by each of the self-powered agricultural data collection devices 102.

Each of the self-powered agricultural output devices 120 includes at least one energy collector 122. The at least one energy collector 122 may include any number and/or combination of current and/or future developed energy collection devices or systems capable of converting one or more environmental phenomenon to electrical energy. A non-limiting example of an energy collector 122 may include, but is not limited to, one or more solar energy collection devices such as one or more polymorphic silicon solar cells or one or more polymer solar cells.

In embodiments, each of the self-powered agricultural output devices 120 may include at least one final control element 124. In other embodiments, each of the self-powered agricultural output devices 120 may include one or more outputs conductively coupled to a final control element 124 in a manner that operates the final control element 124, for example by changing or altering the operational state of the final control element 124. In some implementations, the self-powered agricultural output devices 120 may include a powered output that is used to energize/de-energize a final control element. In other implementations, the self-powered agricultural output devices 120 may include one or more sets of dry contacts the position of which (e.g., OPEN or CLOSE operational state) may be controlled or otherwise determined by the control circuit 128.

Each final control element 124 may permit the dispersal of one or more agricultural resources 160 across or about at least a portion of the agricultural area 150. In some implementations, the final control element 124 may evenly or unevenly, equally or unequally distribute the agricultural resources 160 across at least a portion of the agricultural area 150. The final control element 124 may include any number and/or combination of any current and/or future devices and/or systems capable of distributing one or more environmental resources across at least a portion of the agricultural area 150. Such agricultural resource 160 may include one or more materials having any form: solid, liquid, or gas. Such agricultural resources 160 may include, but are not limited to, water, fertilizer, iron, herbicide, or pesticide. Each of the final control elements 124 may be self-powered (e.g., via a self-contained solar cell), externally powered (e.g., via an external power grid), or powered by the self-powered agricultural output devices 120.

Each of the self-powered agricultural output devices 120 includes at least one communications interface 126. In embodiments, the at least one communications interface 126 may include any number and/or combination of any current and/or future wired or wireless communication interface 126. The at least one communications interface 126 may communicate using one or more standard communication protocols, one or more proprietary communication protocols, or combinations thereof. Example wireless communication protocols may include, but are not limited to, BLUETOOTH® (IEEE 802.15.1, latest version), BLUETOOTH Low Energy (BLE) or BLUETOOTH Smart®, Near Field Communication (NFC-ISO/IEC 14443, latest version), or ZigBee Mesh (IEEE 802.15.4, latest version). The at least one communications interface 126 may include any number and/or combination of current and/or future developed communication interface capable of at least receiving a wireless (e.g., radio frequency, optical) signal carrying data or information indicative of the one or more environmental parameters transmitted by one or more self-powered agricultural data collection devices 102.

In some instances, the control circuit 128 may provide or otherwise assist in the determination of the time or quantity of agricultural resource to distribute across all or a portion of the agricultural area 150. In such instances, as a portion of a distributed control system, the control circuit 128 may bidirectionally communicate with one or more control circuits 128 in different self-powered agricultural output devices 120 and/or one or more control circuits 110 in at least some of the self-powered agricultural data collection devices 102.

Each of the self-powered agricultural output devices 120 includes at least one control circuit 128. In embodiments, the at least one control circuit 128 may include one or more circuits or similar devices capable of executing machine-readable instruction sets. In some implementations, the at least one control circuit 128 may include any number and/or combination of any current and/or future developed devices and/or systems including any number of selectively configurable circuits containing electronic devices and/or semiconductor components. In embodiments, the at least one control circuit 128 may include, but is not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), field programmable gate arrays (FPGAs), and the like. In some implementations, the at least one control circuit 128 may include one or more low power consumption devices. An example control circuit 128 may include, but is not limited to, a Risher Mote as manufactured by Intel Corp. (Santa Clara, Calif.).

In some implementations, the at least one control circuit 128 may be communicably coupled to some or all of: the at least one energy collector 122, the at least one final control element 124, and/or the at least one communications interface 126. In some implementations, the at least one control circuit 128 may include one or more digital-to-analog converters, one or more analog-to-digital converters, one or more signal processors, one or more filters, or similar.

In at least some implementations, the control circuit 128 in each of the self-powered agricultural output devices 102 may autonomously execute machine-readable instruction sets. In embodiments, such machine-readable instruction sets may include, but are not limited to, one or more self-learning or self-adapting components that permit the control circuit 128 to receive signals from a number of self-powered agricultural data collection device control circuits 110 and autonomously adapt the final control element 124 to variable environmental conditions as sensed by the respective self-powered agricultural data collection devices 102.

In some implementations, the control circuit 128 in each of the self-powered agricultural output devices 120 may exchange bidirectional communication with at least some of the remaining self-powered agricultural output devices 102 disposed in the agricultural area 150. In such implementations, the control circuits 128 in two or more self-powered agricultural output devices 120 may operate cooperatively and/or act in concert. In such implementations, the control circuits 128 in two or more self-powered agricultural output devices 120 may autonomously execute, in whole or in part, machine-readable instruction sets that include self-learning or self-adapting components that permit the control circuits 128 to autonomously adapt to variable environmental conditions.

Each of the self-powered agricultural output devices 120 includes at least one storage device 130. The at least one storage device 130 may include any number and/or combination of current and/or future developed data storage device capable of storing or otherwise retaining data that may include the one or more machine-readable instruction sets executed by the at least one control circuit 128. Non-limiting examples of such storage devices 130 include electromagnetic storage devices, semiconductor storage devices, magnetic storage devices, electroresistive storage devices, molecular storage devices, or combinations thereof.

In some implementations, some or all of the one or more energy collectors 122, one or more final control elements 124, one or more wireless communications interfaces 126, one or more control circuits 128, and one or more storage devices 130 may be disposed on a single substrate or similar material that forms at least a portion of the structure of each of the self-powered output devices 120. In at least some implementations, the self-powered agricultural output devices 120 may be advantageously fabricated using a weatherproof (e.g., waterproof) package. Furthermore, the self-powered agricultural output devices 120 may advantageously be manufactured in small sizes and relatively inexpensively to permit the distribution of output devices in relatively dense concentrations across an agricultural area 150.

Figure 2:
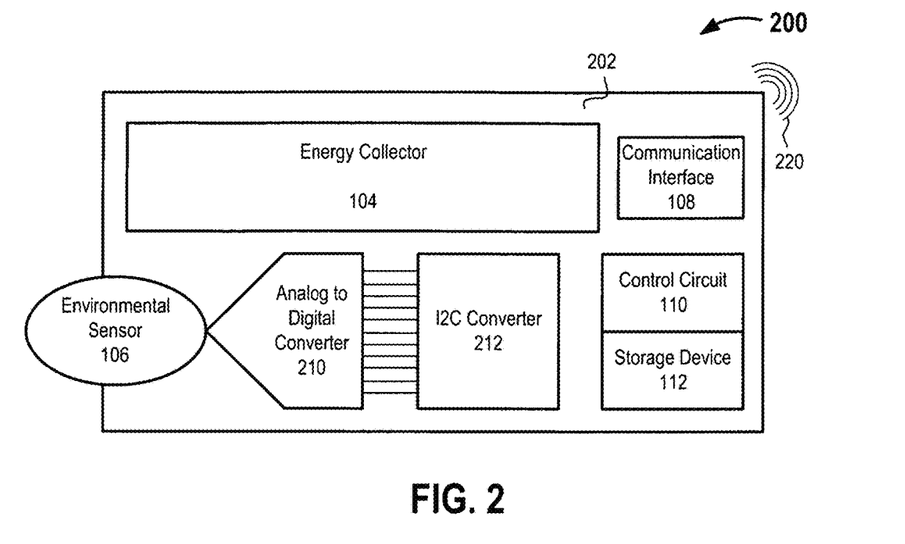
FIG. 2 is a block diagram of an illustrative self-powered agricultural data collection device that may be used in conjunction with an intelligent agricultural system such as that depicted in FIG. 1, in accordance with at least one embodiment of the present disclosure.

FIG. 2 is a block diagram of an illustrative self-powered agricultural data collection device 200 that may be used in conjunction with an intelligent agricultural system 100 such as that depicted in FIG. 1, in accordance with at least one embodiment of the present disclosure. The self-powered agricultural data collection device 200 may include an energy collector 104, an environmental sensor 106, a communication interface 108, a control circuit 110, a storage device 112, an analog-to-digital (A/D) converter 210, and an I2C converter 212. In at least some implementations, some or all of the components may be disposed on a substrate 202. The self-powered agricultural data collection device 200 depicted in FIG. 2 may advantageously be inexpensively fabricated in a small form factor. Such may beneficially permit the dispersal of a large number of self-powered agricultural data collection devices 200 across an agricultural area 150, thereby permitting the control of numerous localized agricultural areas 140 within a larger agricultural area 150.

The A/D converter 210 may convert an analog signal provided by the environmental sensor 106 to one or more signals that include digital data or information. In embodiments, the A/D converter 210 quantizes the input provided by the environmental sensor 106 and may introduce a small amount of error. In embodiments, the A/D converter 210 may perform the conversion on a periodic basis by sampling the signal provided by the environmental sensor 106. Such periodic sampling of the signal provided by the environmental sensor 106 may create a sequence of digital values that have been converted from a continuous-time and continuous-amplitude analog signal provided by the environmental sensor 106 to a discrete-time and discrete-amplitude digital signal that is provided to the I2C converter 212 and, subsequently, to the control circuit 110.

The I2C converter 212 may include any number and/or combination of current and/or future devices and/or systems capable of communicably coupling the environmental sensor 106 and/or A/D converter 212 to the control circuit 110. In some implementations, the I2C converter may include any number and/or combination of current and/or future devices and/or systems used to attach lower-speed peripheral devices such as the environmental sensor 106 and/or the A/D converter 212 to a relatively higher speed device such as the control circuit 110. In some implementations, the communications interface 108 may include one or more devices capable of transmitting and/or receiving at least one wireless signal 220 using one or more defined industry standard or proprietary communication protocols, for example BLUETOOTH Low Energy or ZigBee Mesh communications protocols.

Figure 3:
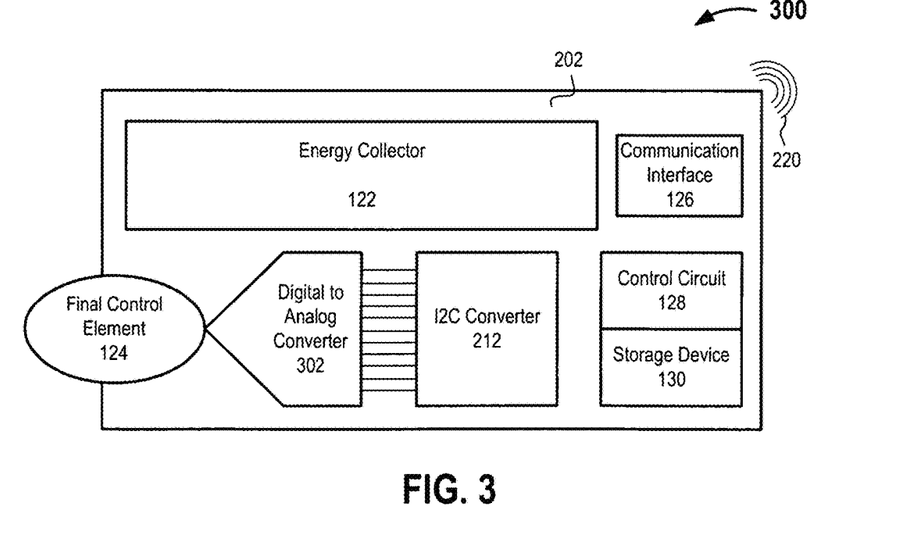
FIG. 3 is a block diagram of an illustrative self-powered agricultural output device that may be used in conjunction with an intelligent agricultural system such as that depicted in FIG. 1, in accordance with at least one embodiment of the present disclosure.

FIG. 3 is a block diagram of an illustrative self-powered agricultural output device 300 that may be used in conjunction with an intelligent agricultural system 100 such as that depicted in FIG. 1, in accordance with at least one embodiment of the present disclosure. The self-powered agricultural output devices 300 may include an energy collector 122, a final control element 124, a communication interface 126, a control circuit 128, a storage device 130, a digital-to-analog (D/A) converter 302, and an I2C converter 212. In at least some implementations, some or all of the components may be disposed on a substrate 202. The self-powered agricultural output devices 300 depicted in FIG. 3 may advantageously be inexpensively fabricated in a small form factor. Such may beneficially permit the dispersal of a large number of self-powered agricultural output devices 300 across an agricultural area 150, thereby permitting the control of numerous localized agricultural areas 140 within a larger agricultural area 150.

In embodiments, the D/A converter 302 may convert a digital signal provided by the I2C converter 212 to an analog signal used to control one or more parameters of an analog final control element 124. In some embodiments, some or all of the self-powered agricultural output devices 300 may control a digital or digitally operated final control element 124. In such embodiments, the digital or digitally operated final control element 124 may be communicably coupled to the I2C converter 212.

Figure 4:
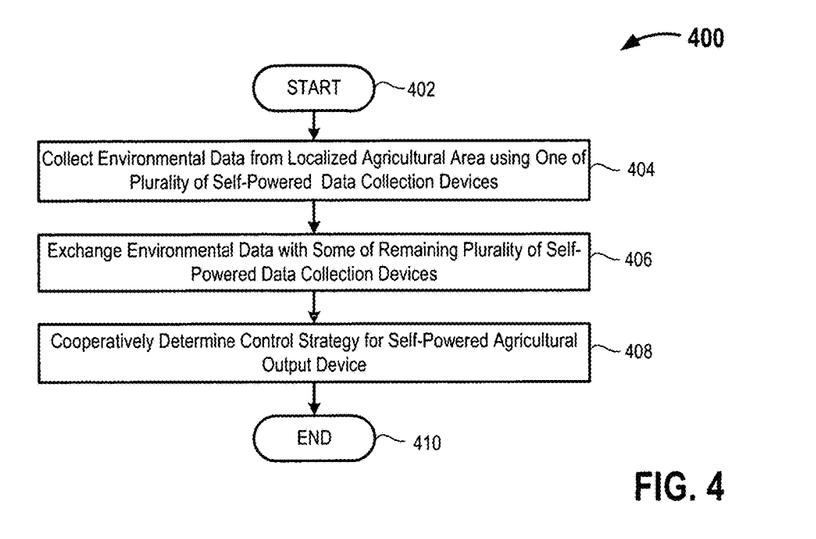
FIG. 4 is a high-level flow diagram of an illustrative intelligent agricultural system, in accordance with at least one embodiment of the present disclosure.

FIG. 4 is a high-level flow diagram of an illustrative intelligent agricultural method 400, in accordance with at least one embodiment of the present disclosure. The control circuit 110 in each of a plurality of self-powered agricultural data collection devices 102 and/or the control circuit 118 in each of a plurality of self-powered agricultural output devices 120 may cooperatively execute machine-readable instructions that cause the selective distribution of one or more agricultural resources. In some instances, such an agricultural system may selectively apply one or more agricultural resources 160 in localized agricultural areas 140, for example the agricultural system may apply a specific agricultural resource 160 in a localized agricultural area 140 identified as deficient in the specific resource by one or more self-powered agricultural data collection devices 102. The method commences at 402.

At 404, the self-powered agricultural data collection devices 102 collect environmental data from any number of localized agricultural areas 140 disposed about a larger agricultural area 150. Such environmental data may include, but is not limited to one or more of the following: moisture level, nitrogen level, potassium level, phosphorous level, iron level, herbicide level, or pesticide level.

At 406, the self-powered agricultural data collection devices 102 bidirectionally communicate the collected environmental data with at least some of the remaining self-powered agricultural data collection devices 102 and/or at least some of a plurality of self-powered agricultural output devices 120.

At 408, the control circuits 110 in some or all of the remaining self-powered agricultural data collection devices 102 and/or some or all of the control circuits 128 in the plurality of self-powered agricultural output devices 120 may collaborate or otherwise cooperate to determine an appropriate control strategy for either or both the localized agricultural area 140 and/or the agricultural area 150 as a whole. Responsive to determining an appropriate control strategy, a self-powered agricultural output device 120 may selectively generate a control output and/or cause the operation of one or more final control elements 128 to implement at least a portion of the control strategy determined at 406. The method 400 concludes at 410.

Figure 5:
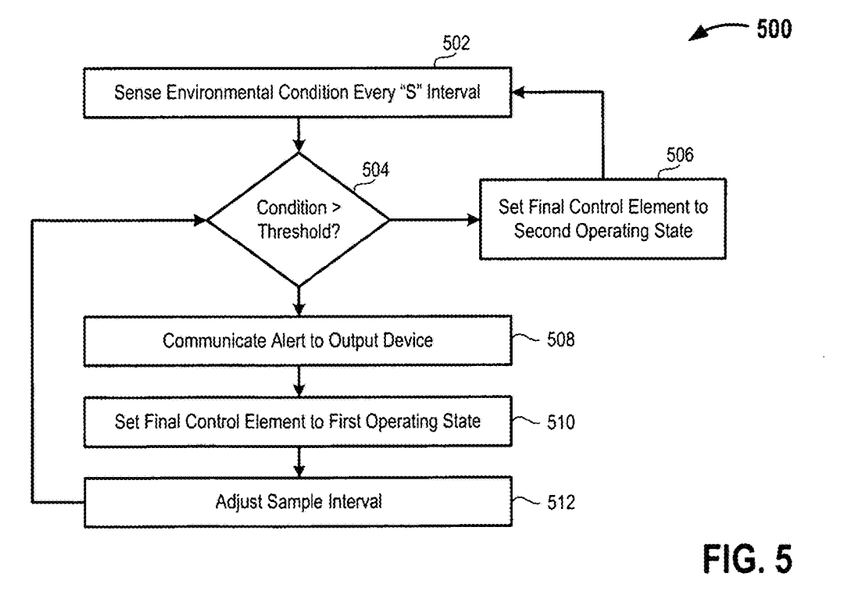
FIG. 5 is a high level flow diagram of another illustrative intelligent agricultural system, in accordance with at least one embodiment of the present disclosure.

FIG. 5 is a high level flow diagram of another illustrative intelligent agricultural method 500, in accordance with at least one embodiment of the present disclosure. In some implementations, some or all of the self-powered agricultural data collection devices 102 may use a first sampling interval to detect an occurrence of an environmental condition that exceeds one or more thresholds (soil moisture less than a defined threshold, fertilizer concentration or availability less than a defined threshold, pesticide concentration/level less than a defined threshold, herbicide concentration/level less than an acceptable level, etc.). After adjusting one or more final control elements to ameliorate the detected environmental condition, the self-powered agricultural data collection devices 102 may use a second sampling interval that is different than the first sampling interval (e.g., more or less frequent than the first sampling interval) to detect when the environmental condition is satisfied, for example when the detected environmental condition returns to an acceptable range or passed above or below a defined threshold value.

At 502, some or all of the self-powered agricultural data collection devices 102 may collect environmental data using the one or more environmental sensors 106 at a first sampling rate. Such sample collection may occur at the first sampling rate until the sensed environmental condition passes (i.e., increases above or decreases below) one or more defined threshold values.

At 504, the control circuits 110 in some or all of the self-powered agricultural data collection devices 102 may determine whether a value associated with a sensed environmental condition has passed one or more defined threshold values. At 506, if the value associated with the sensed environmental condition has not passed the one or more defined threshold values, the control circuits 110 may continue sampling at the first sampling rate at 502.

At 508, if the value associated with the sensed environmental condition has passed (i.e., increased above or decreased below) the one or more defined threshold values, the control circuit 110 may communicate an alert to at least one self-powered agricultural output devices 120. In some instances, the control circuit 110 may transmit such an alert to a specific self-powered agricultural output devices 120, for example using an addressed message directed to an address associated with the respective self-powered agricultural output device 120. In some instances, the control circuit 110 may broadcast such an alert along with a specific address associated with a specific self-powered agricultural output device 120.

At 510, responsive to receiving an alert, one or more self-powered agricultural output devices 120 may transition the operational state of one or more final control elements 128 from a first operational state (e.g., CLOSED/OFF) to a second operational state (e.g., OPEN/ON). Transitioning the final control element 128 from a first operational state to a second operational state may, in some implementations, provide a quantity of one or more agricultural resources 160 (e.g., water, fertilizer, herbicide, pesticide) to a localized agricultural area 140 or to the entire agricultural area 150.

At 512, responsive to the final control element 128 being placed in the second operational state, some or all of the self-powered agricultural data collection devices 102 may alter, adjust, or change the sampling frequency of the environmental sensors 106 to a second sampling frequency that is different than the first sampling frequency. In some implementations, the second sampling frequency may be greater (i.e., more frequent) than the first sampling frequency since the application of an agricultural resource 160 to an agricultural area 150 or a localized agricultural area 140 may change at a faster rate than the loss of the corresponding agricultural resource 160 from the respective agricultural area 150 or localized agricultural area 140.

The following examples pertain to further embodiments. The following examples of the present disclosure may comprise subject material such as devices, systems, and methods that facilitate the management of one or more agricultural resources 160 in an agricultural area 150 and/or a localized agricultural area 140 using a plurality of self-powered agricultural data collection devices 102 and a plurality of self-powered agricultural output devices 120.

According to example 1, there is provided an agricultural resource management system. The system may include a plurality of self-powered data collection devices disposed across at least a portion of an agricultural area. Each of the self-powered agricultural data collection devices may include: an energy collector; an environmental sensor; a communication interface; a control circuit communicably coupled to the environmental sensor; a storage device communicably coupled to the control circuit, the storage device including machine-readable instructions, that when executed by the control circuit. The control circuit may collect environmental data within a localized agricultural area proximate the self-powered data collection device via the environmental sensor; exchange at least a portion of the collected environmental data with at least some of the remaining plurality of self-powered data collection devices; and cooperatively monitor and control distribution of an agricultural resource across at least a portion of the agricultural area that includes the respective localized agricultural area proximate the respective self-powered data collection device.

Example 2 may include elements of example 1 and may further include at least one self-powered output device to control the distribution of the agricultural resource across at least a portion of the agricultural area. Each self-powered agricultural output device may include: an energy collector; a final control element; a communication interface; a control circuit communicably coupled to the final control element; and a storage device communicably coupled to the control circuit, the storage device including machine-readable instructions, that when executed by the control circuit. The control circuit may receive a command to from at least one of the plurality of self-powered data collection devices; and responsive to receiving the command, distribute an agricultural resource across the portion of the agricultural area.

Example 3 may include elements of example 1 where the energy collector further comprises an energy storage device.

Example 4 may include elements of any of examples 1 through 3 where the energy collector comprises a solar energy collection device.

Example 5 may include elements of any of examples 1 through 3 where the communication interface comprises at least one of: a Bluetooth Low Energy (BLE) communication interface or a Zigbee® Mesh communication interface.

Example 6 may include elements of example 2 where the environmental sensor comprises at least one of: a moisture sensor, a nitrogen sensor, a phosphorous sensor, a potassium sensor, or an iron sensor.

Example 7 may include elements of example 6 where the final control element comprises at least one of: an irrigation valve or a fertilizer feed valve.

Example 8 may include elements of example 2 where the environmental sensor comprises at least one of: an herbicide specific sensor or an insecticide specific sensor.

Example 9 may include elements of example 8 where the final control element comprises: an herbicide application valve or an insecticide application valve.

According to example 10, there is provided a self-powered agricultural data collection device. The self-powered agricultural data collection device may include an energy collector; an environmental sensor; a communication interface; a control circuit communicably coupled to the environmental sensor; and a storage device communicably coupled to the control circuit, the storage device including machine-readable instructions. The machine-readable instructions causing the control circuit to: collect environmental data within a localized agricultural area proximate the self-powered data collection device via the environmental sensor; exchange at least a portion of the collected environmental data with at least some of a plurality of self-powered data collection devices; and cooperatively monitor and control, with the at least some of the plurality of self-powered data collection devices, at least one output device that distributes an agricultural resource across at least a portion of the agricultural area that includes the respective localized agricultural area proximate the respective self-powered data collection device.

Example 11 may include elements of example 10 where the energy collector further comprises an energy storage device.

Example 12 may include elements of any of examples 10 or 11 where the energy collector comprises a solar energy collection device.

Example 13 may include elements of any of examples 10 or 11 where the communication interface comprises at least one of: a Bluetooth Low Energy (BLE) communication interface or a Zigbee® Mesh communication interface.

Example 14 may include elements of example 10 where the environmental sensor comprises at least one of: a moisture sensor, a nitrogen sensor, a phosphorous sensor, a potassium sensor, or an iron sensor.

Example 15 may include elements of example 10 where the environmental sensor comprises at least one of: an herbicide specific sensor or an insecticide specific sensor.

According to example 16, there is provided an agricultural data collection method. The method may include collecting environmental data within a localized agricultural area proximate each respective one of a plurality of self-powered agricultural data collection devices via an environmental sensor communicably coupled to each respective one of the self-powered agricultural data collection devices. The method may further include exchanging at least a portion of the collected environmental data with at least some of the plurality of self-powered data collection devices and cooperatively determining, by at least a portion of the plurality of self-powered agricultural data collection devices, a control strategy for at least one self-powered agricultural output device that distributes an agricultural resource across at least a portion of the localized agricultural area proximate each respective one of the plurality of self-powered agricultural data collection devices.

Example 17 may include elements of example 16, and may additionally include causing the at least one self-powered agricultural output device to distribute the agricultural resource across at least a portion of the localized agricultural area proximate each respective one of the plurality of self-powered agricultural data collection devices per the cooperatively determined control strategy.

Example 18 may include elements of example 16, and may additionally include collecting energy from the ambient environment via an energy collector operably coupled to each respective one of the plurality of self-powered agricultural data collection devices.

Example 19 may include elements of example 18, and may additionally include storing at least a portion of the collected energy using an energy storage device operably coupled to each respective one of the plurality of self-powered agricultural data collection devices.

Example 20 may include elements of example 16 where collecting energy from the ambient environment via an energy collector operably coupled to each respective one of the plurality of self-powered agricultural data collection devices may include collecting energy from the ambient environment via a solar energy collector operably coupled to each respective one of the plurality of self-powered agricultural data collection devices.

Example 21 may include elements of example 16 where exchanging at least a portion of the collected environmental data with at least some of the plurality of self-powered data collection devices may include exchanging at least a portion of the collected environmental data with at least some of the plurality of self-powered data collection devices via a wireless communication interface operably coupled to each respective one of the plurality of self-powered agricultural data collection devices.

Example 22 may include elements of example 21 where exchanging at least a portion of the collected environmental data with at least some of the plurality of self-powered data collection devices via a wireless communication interface may include exchanging at least a portion of the collected environmental data with at least some of the plurality of self-powered data collection devices via a wireless communication interface that includes at least one of: a Bluetooth Low Energy (BLE) communication interface or a Zigbee® Mesh communication interface.

Example 23 may include elements of example 16 where collecting environmental data within a localized agricultural area proximate each respective one of a plurality of self-powered agricultural data collection devices may include collecting environmental data within a localized agricultural area using an environmental sensor operably coupled to each respective one of the plurality of self-powered agricultural data collection devices.

Example 24 may include elements of example 23 where collecting environmental data within a localized agricultural area using an environmental sensor operably coupled to each respective one of the plurality of self-powered agricultural data collection devices may include collecting environmental data within a localized agricultural area using an environmental sensor that includes at least one of: a moisture sensor, a nitrogen sensor, a phosphorous sensor, a potassium sensor, or an iron sensor.

Example 25 may include elements of example 16 where cooperatively determining a control strategy for at least one self-powered agricultural output device may include cooperatively determining a control strategy for at least one self-powered agricultural output device that includes at least one of: an irrigation valve or a fertilizer feed valve.

Example 26 may include elements of example 23 where collecting environmental data within a localized agricultural area using an environmental sensor operably coupled to each respective one of the plurality of self-powered agricultural data collection devices may include collecting environmental data within a localized agricultural area using an environmental sensor that includes at least one of: an herbicide specific sensor or an insecticide specific sensor.

Example 27 may include elements of example 16 where cooperatively determining a control strategy for at least one self-powered agricultural output device may include cooperatively determining a control strategy for at least one self-powered agricultural output device that includes at least one of: an herbicide application valve or an insecticide application valve.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. An agricultural resource management system, comprising:
    a plurality of self-powered data collection devices disposed across at least a portion of an agricultural area, each of the self-powered data collection devices including:
    an energy collector;
    an environmental sensor;
    a communication interface;
    a control circuit communicably coupled to the environmental sensor;
    a storage device communicably coupled to the control circuit, the storage device including machine-readable instructions, that when executed by the control circuit, cause the control circuit to:
        collect environmental data at a first sampling interval within a localized agricultural area proximate the self-powered data collection device via the environmental sensor;
        exchange at least a portion of the collected environmental data with at least some of the remaining plurality of self-powered data collection devices;
        responsive to detecting at least one environmental condition outside a defined range:
            cause at least one self-powered output device in the localized agricultural area proximate the self-powered data collection device to transition from a first operating state to a second operating state; and
            collect environmental data at a second sampling interval within the localized agricultural area proximate the self-powered data collection device via the environmental sensor wherein the second sampling interval includes an interval temporally shorter in duration than the first sampling interval; and
        cooperatively monitor and control distribution of an agricultural resource across at least a portion of the agricultural area that includes the respective localized agricultural area proximate the respective self-powered data collection device; and
        responsive to detecting the at least one environmental condition within the defined range:
            cause the at least one self-powered output device in the localized agricultural area proximate the self-powered data collection device to transition from the second operating state to the first operating state; and
            collect environmental data at the first sampling interval within the localized agricultural area proximate the self-powered data collection device via the environmental sensor.

2. The agricultural resource management system of claim 1, further comprising:
    the at least one self-powered output device to control the distribution of the agricultural resource across at least a portion of the agricultural area, each self-powered output device including:
    an energy collector;
    a final control element;
    a communication interface;
    a control circuit communicably coupled to the final control element;
    a storage device communicably coupled to the control circuit, the storage device including machine-readable instructions, that when executed by the control circuit, cause the control circuit to:
        receive a first command to from at least one of the plurality of self-powered data collection devices that causes the at least one self-powered output device to transition from the first operating state to the second operating state;
        receive a second command from at least one of the plurality of self-powered data collection devices that causes the at least one self-powered output device to transition from the second operating state to the first operating state.

3. The agricultural resource management system of claim 1 wherein the energy collector comprises a solar energy collection device.

4. The agricultural resource management system of claim 1 wherein the communication interface comprises at least one of: a Bluetooth Low Energy (BLE) communication interface or a Zigbee® Mesh communication interface.

5. The agricultural resource management system of claim 2 wherein the environmental sensor comprises at least one of: a moisture sensor, a nitrogen sensor, a phosphorous sensor, a potassium sensor, or an iron sensor.

6. The agricultural resource management system of claim 5 wherein the final control element comprises at least one of: an irrigation valve or a fertilizer feed valve.

7. The agricultural resource management system of claim 2 wherein the environmental sensor comprises at least one of: an herbicide specific sensor or an insecticide specific sensor.

8. The agricultural resource management system of claim 7 wherein the final control element comprises: an herbicide application valve or an insecticide application valve.

9. A self-powered agricultural data collection device, comprising:
an energy collector;
an environmental sensor;
a communication interface;
a control circuit communicably coupled to the environmental sensor;
a storage device communicably coupled to the control circuit, the storage device including machine-readable instructions, that when executed by the control circuit, cause the control circuit to:
collect environmental data at a first sampling interval within a localized agricultural area proximate the self-powered data collection device via the environmental sensor;
exchange at least a portion of the collected environmental data with at least some of a plurality of self-powered data collection devices;
responsive to detecting at least one environmental condition outside a defined range:
cause at least one self-powered output device in the localized agricultural area proximate the self-powered data collection device to transition from a first operating state to a second operating state; and
collect environmental data at a second sampling interval within the localized agricultural area proximate the self-powered data collection device via the environmental sensor wherein the second sampling interval includes an interval temporally shorter in duration than the first sampling interval;
cooperatively monitor and control, with the at least some of the plurality of self-powered data collection devices, at least one output device that distributes an agricultural resource across at least a portion of an agricultural area that includes the respective localized agricultural area proximate the respective self-powered data collection device; and
responsive to detecting the at least one environmental condition within the defined range:
cause the at least one self-powered output device in the localized agricultural area proximate the self-powered data collection device to transition from the second operating state to the first operating state; and
collect environmental data at the first sampling interval within the localized agricultural area proximate the self-powered data collection device via the environmental sensor.

10. The self-powered agricultural data collection device of claim 9 wherein the energy collector comprises a solar energy collection device.

11. The self-powered agricultural data collection device of claim 9 wherein the communication interface comprises at least one of: a Bluetooth Low Energy (BLE) communication interface or a Zigbee® Mesh communication interface.

12. The self-powered agricultural data collection device of claim 9 wherein the environmental sensor comprises at least one of: a moisture sensor, a nitrogen sensor, a phosphorous sensor, a potassium sensor, or an iron sensor.

13. The self-powered agricultural data collection device of claim 9 wherein the environmental sensor comprises at least one of: an herbicide specific sensor or an insecticide specific sensor.

14. An agricultural data collection method, comprising:
collecting environmental data at a first sampling interval within a localized agricultural area proximate each respective one of a plurality of self-powered agricultural data collection devices via an environmental sensor communicably coupled to each respective one of the self-powered agricultural data collection devices;
exchanging at least a portion of the collected environmental data with at least some of the plurality of self-powered data collection devices;
responsive to detecting at least one environmental condition outside a defined range:
causing at least one self-powered output device in the localized agricultural area proximate the self-powered data collection device to transition from a first operating state to a second operating state; and
collecting environmental data at a second sampling interval within the localized agricultural area proximate the self-powered data collection device via the environmental sensor wherein the second sampling interval includes an interval temporally shorter in duration than the first sampling interval;
cooperatively determining, by at least a portion of the plurality of self-powered agricultural data collection devices, a control strategy for at least one self-powered agricultural output device that distributes an agricultural resource across at least a portion of the localized agricultural area proximate each respective one of the plurality of self-powered agricultural data collection devices and
responsive to detecting the at least one environmental condition within the defined range:
causing the at least one self-powered output device in the localized agricultural area proximate the self-powered data collection device to transition from the second operating state to the first operating state; and
collecting environmental data at the first sampling interval within the localized agricultural area proximate the self-powered data collection device via the environmental sensor.

15. The agricultural data collection method of claim 14, further comprising:

collecting energy from the ambient environment via an energy collector operably coupled to each respective one of the plurality of self-powered agricultural data collection devices.

16. The agricultural data collection method of claim 15, further comprising:
storing at least a portion of the collected energy using an energy storage device operably coupled to each respective one of the plurality of self-powered agricultural data collection devices.

17. The agricultural data collection method of claim 14 wherein collecting energy from the ambient environment via an energy collector operably coupled to each respective one of the plurality of self-powered agricultural data collection devices comprises:
collecting energy from the ambient environment via a solar energy collector operably coupled to each respective one of the plurality of self-powered agricultural data collection devices.

18. The agricultural data collection method of claim 14 wherein exchanging at least a portion of the collected environmental data with at least some of the plurality of self-powered data collection devices comprises:
exchanging at least a portion of the collected environmental data with at least some of the plurality of self-powered data collection devices via a wireless communication interface operably coupled to each respective one of the plurality of self-powered agricultural data collection devices.

19. The agricultural data collection method of claim 18 wherein exchanging at least a portion of the collected environmental data with at least some of the plurality of self-powered data collection devices via a wireless communication interface comprises:
exchanging at least a portion of the collected environmental data with at least some of the plurality of self-powered data collection devices via a wireless communication interface that includes at least one of: a Bluetooth Low Energy (BLE) communication interface or a Zigbee® Mesh communication interface.

20. The agricultural data collection method of claim 14 wherein collecting environmental data within a localized agricultural area proximate each respective one of a plurality of self-powered agricultural data collection devices comprises:
collecting environmental data within a localized agricultural area using an environmental sensor operably coupled to each respective one of the plurality of self-powered agricultural data collection devices.

21. The agricultural data collection method of claim 20 wherein collecting environmental data within a localized agricultural area using an environmental sensor operably coupled to each respective one of the plurality of self-powered agricultural data collection devices comprises:
collecting environmental data within a localized agricultural area using an environmental sensor that includes at least one of: a moisture sensor, a nitrogen sensor, a phosphorous sensor, a potassium sensor, or an iron sensor.

22. The agricultural data collection method of claim 14 wherein cooperatively determining a control strategy for at least one self-powered agricultural output device comprises:
cooperatively determining a control strategy for at least one self-powered agricultural output device that includes at least one of: an irrigation valve or a fertilizer feed valve.

23. The agricultural data collection method of claim 20 wherein collecting environmental data within a localized agricultural area using an environmental sensor operably coupled to each respective one of the plurality of self-powered agricultural data collection devices comprises:
collecting environmental data within a localized agricultural area using an environmental sensor that includes at least one of: an herbicide specific sensor or an insecticide specific sensor.

24. The agricultural data collection method of claim 14 wherein cooperatively determining a control strategy for at least one self-powered agricultural output device comprises:
cooperatively determining a control strategy for at least one self-powered agricultural output device that includes at least one of: an herbicide application valve or an insecticide application valve.

* * * * *